(12) United States Patent
Johnson et al.

(10) Patent No.: US 9,539,646 B2
(45) Date of Patent: Jan. 10, 2017

(54) SELF-SYNCHRONIZING TAP DRIVER FOR RIGID/SYNCHRONOUS TAPPING WITH ADJUSTABLE TENSION AND/OR COMPRESSION

(75) Inventors: Mark F. Johnson, Harrison, ID (US); Allan S. Johnson, Harrison, ID (US)

(73) Assignee: The Tapmatic Corporation, Post Falls, ID (US)

( * ) Notice: Subject to any disclaimer, the term of this patent is extended or adjusted under 35 U.S.C. 154(b) by 937 days.

(21) Appl. No.: 13/199,763

(22) Filed: Sep. 7, 2011

(65) Prior Publication Data

US 2013/0059669 A1    Mar. 7, 2013

(51) Int. Cl.
*B23B 31/08* (2006.01)

(52) U.S. Cl.
CPC .......... *B23B 31/083* (2013.01); *B23B 2231/54* (2013.01)

(58) Field of Classification Search
CPC .... B23B 2231/54; B23B 31/028; B23B 31/08; B23B 31/083
USPC .......... 470/96, 103, 104, 181, 198; 408/141, 408/156, 238
See application file for complete search history.

(56) References Cited

U.S. PATENT DOCUMENTS 6,569,022 B2 * 5/2003 Johnson et al. ................ 470/96
7,708,506 B2 * 5/2010 Johnson et al. ............. 408/238

* cited by examiner

*Primary Examiner* — Debra Sullivan
(74) *Attorney, Agent, or Firm* — Wells St. John, P.S.

(57) ABSTRACT

Disclosed is a tap driver for rigid tapping, which includes adjustable tension and compression of the tap driver. In the preferred embodiment, the tap drive is adjustable by rotation of the outer collar between a plurality of settings, each of which provide a different tension or compression in the tap driver.

16 Claims, 7 Drawing Sheets

SELF-SYNCHRONIZING TAP DRIVER FOR RIGID/SYNCHRONOUS TAPPING WITH ADJUSTABLE TENSION AND/OR COMPRESSION

CROSS REFERENCE TO RELATED APPLICATION

This application does not claim priority from any other application.

TECHNICAL FIELD

This invention pertains to a self-synchronizing and self-adjusting tap driver for rigid or synchronous tapping, with an adjustable tension and/or compression.

BACKGROUND OF THE INVENTION

For many decades and back to the early 1900's, tension/compression tap drivers were used in production applications such as on transfer or assembly lines in the tapping or cutting of internally threaded holes in parts. These prior tension/compression devices required what the industry views as substantial movability in the tapping attachments because the tapping attachments would generally be utilized for multiple tap sizes and varying hole positions on different and irregular work surfaces. The old conventional machines and even the prior computer controlled machines utilized before rigid tapping was developed in the 1980's, required the springy tension/compression tapping attachments in order to produce good threads.

In or around 1982, synchronous feed or rigid tap and control was invented and developed, and by approximately 1992 the computer programmed and CNC machines became widely used in industry, including for tapping. The precision and accuracy of the newly developed CNC machines completely changed the tapping industry by providing much more precise control over the entire tapping process and tool movement than the older tension/compression tapping attachments. It rendered the old tension/compression tapping attachments too imprecise and antiquated. The new CNC machines provided more precise movement of the tapping attachments and tools to the desired locations, more precise controls over the speed and rotation of the tapping attachments and tapping tools, and the changing of tapping tools utilized.

The industry soon recognized that the new use of rigid tapping via CNC machines outperformed the older methods in several ways. For example, the speed at which the tapping occurred could be optimized for the particular tap, tap size and material being cut, versus the old method and tools wherein the tension/compression tapping attachments needed to be used because generally one slow speed was used for all taps in a multi-spindle tapping application. In another example, the new CNC machines provide a more accurate depth control, which can be important in tapping.

Due to the sophistication and precise performance capabilities of the newer CNC machines, the industry originally assumed that all that was required in the way of a tapping attachment was a simple rigid or soled tapping attachment or tap holder, and the CNC machines would do the rest. In fact early in the process, the machine builders recommended that solid rigid tap holders be used. Eventually rigid tapping has become the preferred and predominant way of cutting or tapping internally threaded holes.

Over time however the industry began to understand that there were physical limitations to any machine because of the mass involved when the tap must be properly located, fed according to the appropriate feed rate for the specific holding tap and threads being cut, slowed down, stopped, and then reversed within each hole. Eventually some companies began to recognize the need to soften up the rigid tapping attachments while still maintaining the rigidness required by these applications. The industry knew the old tension/compression tapping attachments would not work in the new CNC applications and therefore began to use and develop plastic dampeners and O rings to slightly soften the rigid tapping while still maintaining the rigidness required for rigid body tapping.

In machining metallic work pieces, an apparatus called a tap is used to create internally threaded holes for receiving screws in the metallic work pieces. The tap itself is a tool with external cutting threads. In order to create the internally threaded hole in the work piece, the tap is rotated and driven into the work piece to the desired hole depth, and then reverse rotated and retracted from the work piece.

The tap is held by a tap driver, and the tap driver is held or secured within a machine which provides the forward and reverse rotation as well as the forward and reverse drive.

In creating the internally threaded hole, the tap driver is first rotated and driven into the base material or metal to the desired depth. Once the tap reaches the desired depth, the rotation of the tap driver and the tap is reversed and the tap is retracted from the base material. order to create the best internally threaded hole, the tap should be simultaneously advanced and rotated at precisely correlated rates of rotation and forward movement for a given tap pitch. By way of example, a one-quarter-twenty tap should be advanced into the work piece one inch for every twenty revolutions, or 0.05 inch for each revolution. In typical rigid tapping, the driver machines provide the synchronization of the spindle rotation and feed advance to match the tap pitch.

During the creation of a tap hole, the machine spindle goes through several stages, namely driving the rotating tap into the tap hole, slowing the forward drive or feed rate and the rotation until the tap comes to a stop in the work piece, reversing the direction of the rotation and accelerating or increasing the reverse rate of rotation to match the desired tap pitch as the tap is retracted. It will be appreciated by those of ordinary skill in the art that during the changes in rotation speed, the feed advance of the tap must be adjusted or correlated to precisely match the tap pitch. However, in practice it is very difficult to precisely match the rotation, drive and tap pitch and there are small errors that occur in the synchronization of the rotation speed and the feed rate during the deceleration or slowing down phase, and during the reverse rotation acceleration phase.

In machining numerous internally threaded apertures, one machine may be used to drill pilot holes into which the taps are driven, while a different machine may be used for the actual tapping. This may lead to slight positioning errors wherein the tap for instance is not exactly aligned with the pilot hole, but instead may be one or two thousandths of an inch off.

It will be appreciated by those of ordinary skill in the art that there is a need for a tap driver which has some limited flexure for the location errors associated with locating the tap with respect to the desired tap hole location, and a further need for such a tap driver wherein the tension and/or compression can be pre-set and/or adjusted to suit the application.

It is desirable to be able to pre-adjust the stiffness or softness of the tap holder for larger or for smaller taps, and for softer and harder work piece materials. In the pre-setting of the tension and or compression, it is also desirable to impart forces that result in effecting the tension or compression axial movement of the chuck portion from a lateral direction. This lateral direction may be perpendicular to the axis of the tap holder or any one of a number of angles from the side.

It is also advantageous in synchronized tapping to provide a small amount of tension and compression flow in a way that allows the tap holder to be preset or adjusted to different settings so that the holder is more effective for example for larger or smaller taps, harder or softer work piece materials and other reasons desired in a tapping environment.

It is an object of some embodiments of this invention to provide a tap driver wherein the tension and/or compression can be pre-set and/or adjusted to suit the application, incrementally and infinitely.

It is an object of some embodiments of this invention to provide a tap driver which provides a plurality of incrementally different tensions and compressions on the tap driver spindle and consequently the chuck portion of the tap driver.

It is also an object of some embodiments of this invention to provide said adjustability from a lateral direction to the axis of the tap driver, directly or indirectly through a plurality of components.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

In examples of embodiments of this invention in some of its simplest forms, this invention utilizes the imposition or imparting of lateral forces inwardly on the tap driver spindle such that said forces impart a tension or compression in the axial direction and on the chuck portion of the tap driver.

In still further examples or embodiments of this invention, the lateral force may be provided directly or through axial movement of a tap driver component which thereby imposes lateral force or movement.

Additional embodiments of this invention allow for a selectorized preset or predetermined lateral force which is converted to a preset axial compression and/or tension.

Figure 1:
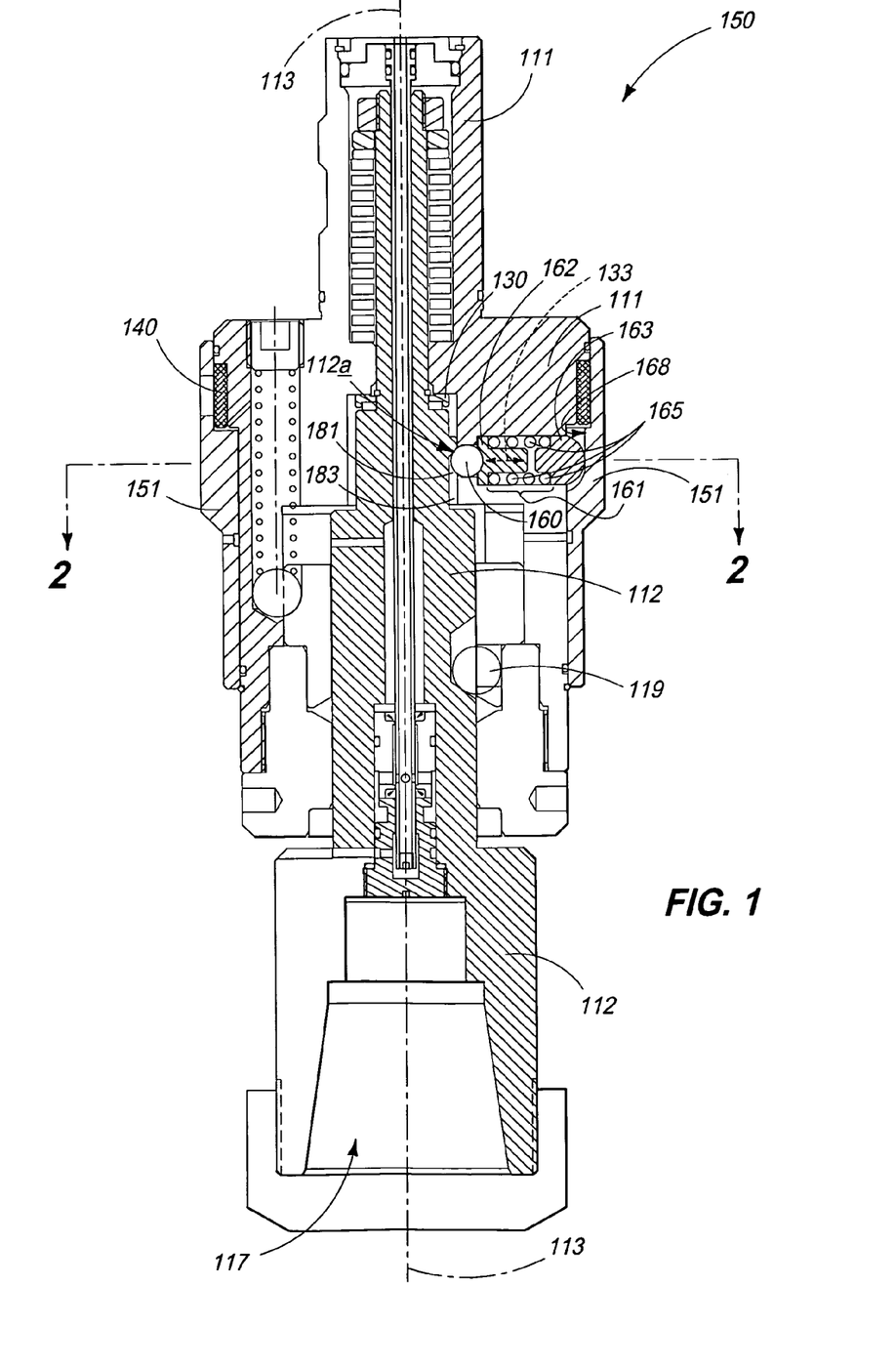
FIG. 1 is a cross-section elevation view of one embodiment contemplated by this invention, illustrating a tap driver in tension.

FIG. 1 is a cross-section elevation view of one embodiment contemplated by this invention, illustrating a tap driver 150 configured in a tension preset. FIG. 1 illustrates tap driver 150, shank portion 111, chuck portion 117, and tap driver spindle 112. It will be appreciated by those of ordinary skill in the art that any one of a number of different type of mechanisms may be used to transmit torque to drive the tap; for example in some embodiments a plurality (three in that embodiment) of drive pins may be utilized in combination with ball bearings as the driver or torque mechanism to rotate the tap.

FIG. 1 further illustrates ram 163 within outer sleeve 151 which provides the lateral force through bearings 160 to tap driver spindle 112. Tap driver spindle 112 clues tap body surface 112a against which bearing 160 presses and the interface between the outer surface of bearing 160 and tap body surface 112a converts the lateral force represented by arrow 133 into a force in the axial direction, represented by axis 113.

In the example of the embodiment of the invention illustrated in FIG. 1, ram 163 includes internal spring 165 that provides a variable length of ram 163 and allows for resilient force in the lateral direction represented by arrow 133 to be imparted on bearing 160. Another feature of this example of the embodiment of the invention is better illustrated in FIG. 2, wherein the invention may provide a selectorized preset or pre-tension which may be imposed upon ram 133 by a rotatable outer sleeve 151.

Figure 2:
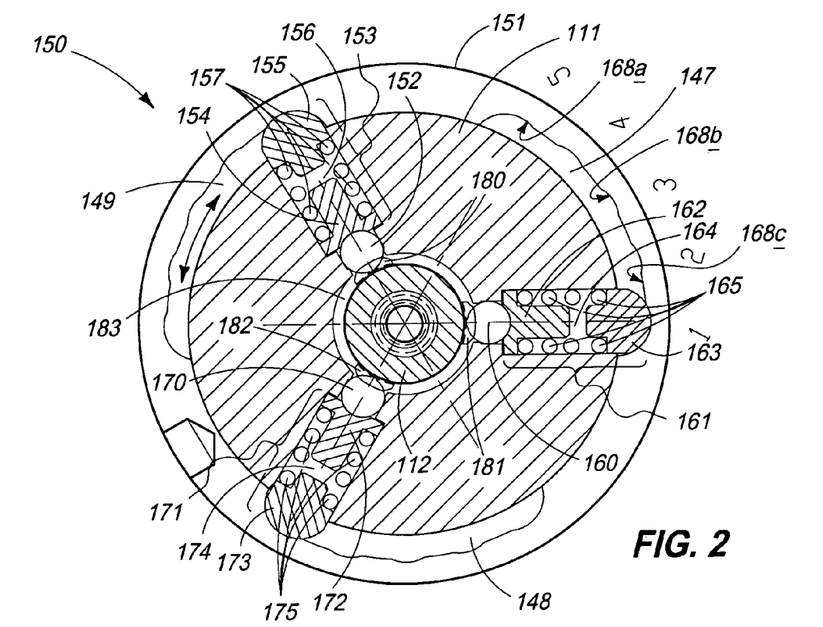
FIG. 2 is cross-sectional view 2-2 from the embodiment of the invention illustrated in FIG. 1.

FIG. 2 illustrates how a first end of the ram may be placed in a cavity or spindle cam which has varying distances from the axis of the tap driver and when the first end of the ram 163 is moved laterally by rotating the sleeve 151, different lateral forces are imposed through the ram 163 and the bearing 160 to the tap driver spindle 112. The interface between the lateral forces imposed through bearing 160 and tap driver spindle surface 112a then converts the lateral forces to vertical or axial forces which is utilized to preset or impose tension or compression forces at the chuck portion 117 of the tap driver.

FIG. 1 illustrates the tap driver spindle surface 112a located above the bearing 160 which, when lateral forces are imposed on the bearing, would tend to push the tap driver spindle 112 upward and preset or pre-impose a tension force in the axial direction on the chuck portion 117. If the tap driver spindle surface is instead located on the opposite or lower side of bearing 160, lateral forces imposed on bearing 160 would conversely cause a downward movement or force on tap driver spindle one 112, consequently placing a preset or pre-imposed compression force on chuck portion 117.

It will be appreciated by those of ordinary or greater skill in the art that the utilization of the imposition of a lateral force is new to the art and that it may be imposed through the movement of a ram in the lateral direction or alternatively through the movement of a ram in the axial direction (axial relative to the tap driver) spaced apart from the axis 113 of the tap driver, but which when interfacing with the bearing 160, will impart a lateral force on the bearing 160. The bearing 160 interfaces with a surface of the tap driver spindle 112 (such as tap driver spindle surface 112a) to convert the lateral force to a vertical or axial force to place the chuck portion 117 of the tap holder in the desired tension or compression.

FIG. 2 is representative cross-sectional view 2-2 from the embodiment of the invention 150 illustrated in FIG. 1, illustrating a combination of three rams 155, 163 and 173, each positioned laterally between the outer sleeve cavities 147 within outer sleeve 151. It will be appreciated by those of ordinary skill in the art that although three rams are utilized in embodiments of the invention, this invention is not so limited and any number of rams may be utilized to practice embodiments of this invention.

FIG. 2 illustrates a first ram 155 with internal springs 157 and a general length 153 positioned between the bearing 152 it interacts with an internal surface of the outer sleeve cavity 149. FIG. 2 also illustrates second ram 163 with internal springs 165 and a general length 161 positioned between its bearing 160 and the internal surface 168c of outer sleeve cavity 147. It will be observed the variable surface of outer sleeve cavity 147, as illustrated by arrow 168a, 168b and 168c provides varying degrees of compression of second ram 163. The varying degrees of compression then result in lateral forces imparted by ram 163 on bearing 160, which then interacts with tap driver spindle 112 to convert the lateral force to an axial force along the axis of the tap holder.

Figure 3:
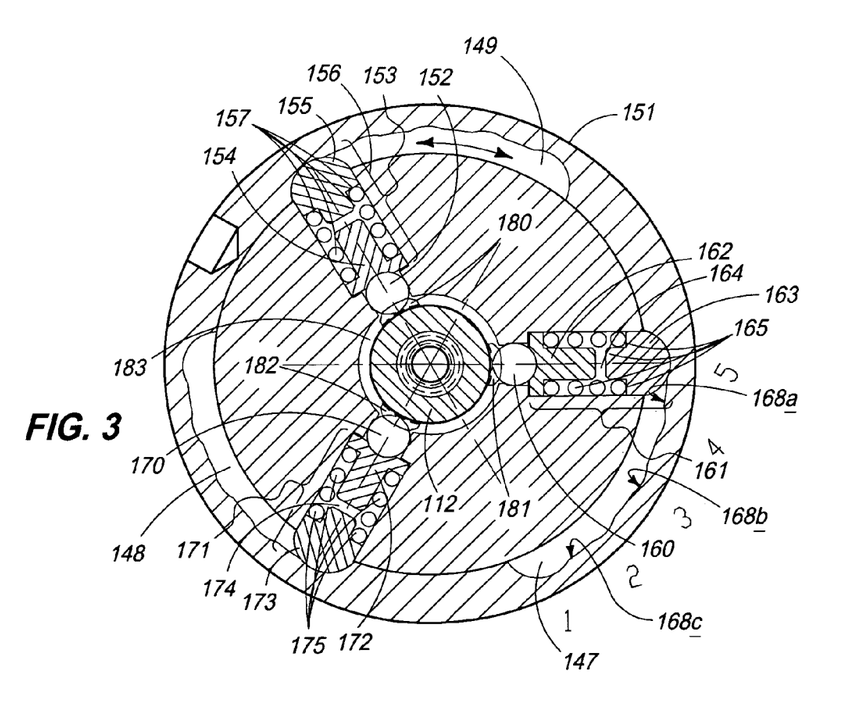
FIG. 3 is cross-sectional view 2-2 from the embodiment of the invention illustrated in FIG. 1, wherein the collar has been rotated relative to its position in FIG. 2.

FIG. 2 further illustrates third ram 173, third ram springs 175 and identifies a second body component 172 of ram 173. The first end of ram 173 is located within outer sleeve cavity 148 and ram 173 has general length 171. Ram 173 abuts and interacts with bearing 170, thereby imposing a lateral force on the tap driver spindle as illustrated in FIG. 2 and FIG. 3. The tap driver spindle interfaces 180, 181 and 182 (may also be referred to as cam pins in the spindle) are configured to abut against can interact with bearings 152, 160 and 170 respectively, to convert the lateral inward forces to forces in either tension and/or compression in the axial direction of the tap driver.

Figure 4:
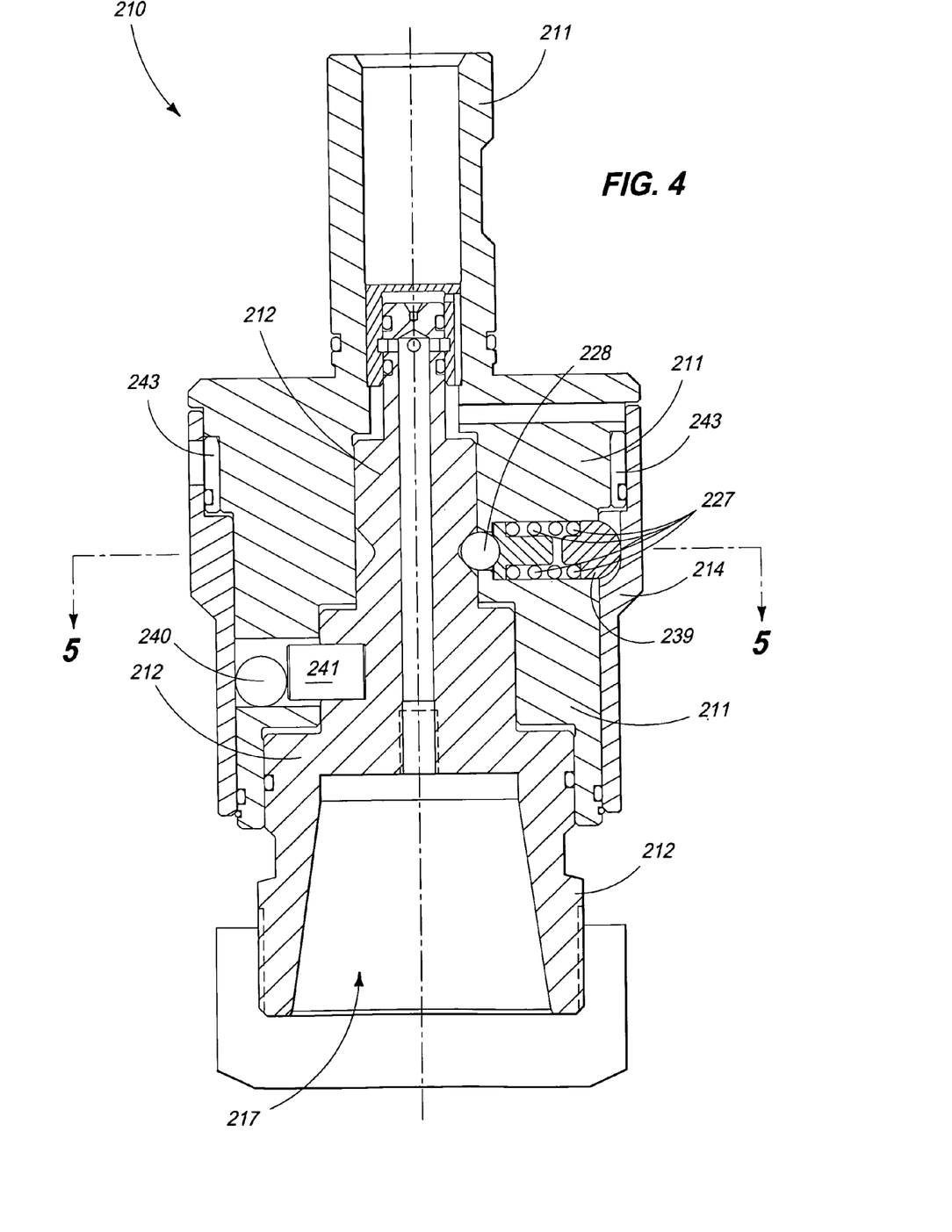
FIG. 4 is a cross-section elevation view of an embodiment contemplated by this invention, illustrating a tap driver in compression.

It will be appreciated by those of ordinary skill in the art that varying the internal surface of the outer sleeve cavity may be utilized to preset the axial tension or compression tap driver to any one of a number of different desired settings in tension and/or compression. In order to ease the interface of the selections created by the different distances within the outer sleeve cavity, a window or a colored ring such as shown in FIG. 4 as item 243 (or item 140 within FIG. 1) may be provided and visible numbers (or colors) 1 through 5 for example may be provided to allow a user to rotate the outer sleeve to a desired number (each representing a different preset force in tension and/or compression). Each of the numbers may represent a predetermined axial tension or compression to be imposed on the chuck portion of the tap holder. The numbers provided for example just outside outer sleeve cavity 147 in FIG. 2 are representative of numbers that may be contained and visit within invisible through window 140 in FIG. 1 or window 243 in FIG. 4.

FIG. 3 is cross-sectional view 2-2 from the embodiment of the invention illustrated in FIG. 1, wherein the collar has been rotated relative to its position in FIG. 2. Similarly numbered items in FIG. 3 are the same as in FIG. 2 and will not be repeated here. FIG. 3 illustrates how the outer sleeve 151 has been rotated (as indicated by arrows within the outer sleeve cavities) relative to the rams 155, 163 and 173 to relocate the first end of rams 155, 163 and 173 within the outer sleeve cavities 147. The relocation of the rams 155, 163 and 173 within the outer sleeve cavities 147 changes the general length of the rams and it can be seen consequently changes the lateral forces imposed on the bearings 152, 160, and 170 respectively. The interface and interaction between the bearings 152, 160 and 170 vis-à-vis the tap driver spindle 112 then changes the axial tension or compression that is preset or imposed on the chuck portion of the tap holder.

FIG. 4 is a cross-section elevation view of an embodiment 210 contemplated by this invention, illustrating a tap driver which may provide preset tension or compression as bearing 228 interfaces with tap driver spindle 212 on both sides of bearing 228. This configuration may allow lateral forces imposed through bearing 228 tap driver spindle 212 to be converted to axial forces in tension and/or compression. Drive pin 241 combined with bearing 240 provides or transmits torque to drive the tap, and may be combined with additional drive pins, preferably three total, to provide the torque around the circumference to drive the tap. FIG. 4 also illustrates shank portion 211 of the tap holder, chuck portion 217 of the tap holder, ram 239 and ram spring 227.

The embodiment of the invention illustrated in FIG. 4 operates similarly to that illustrated in FIG. 1, with a differently ram 239, bearing 228 and tap driver spindle 212 configuration and interaction.

Figure 5:
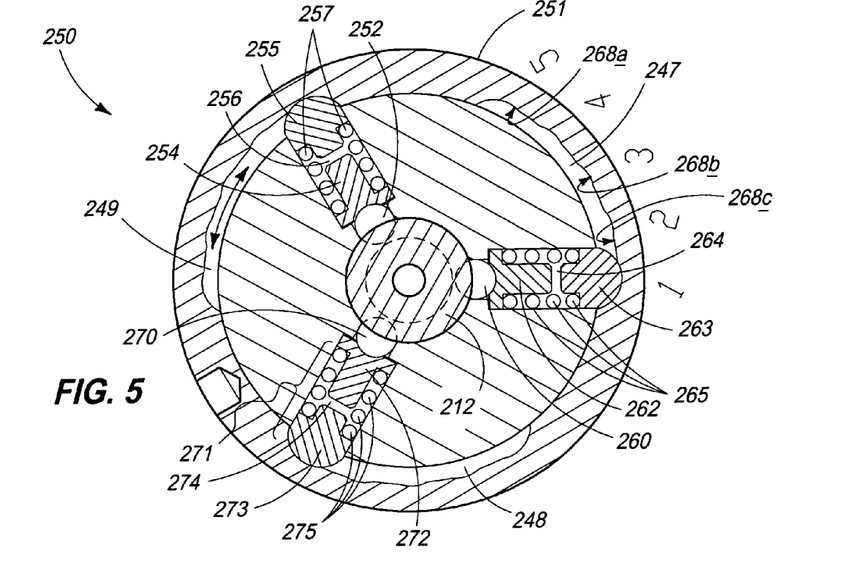
FIG. 5 is a cross-sectional view 5-5 from the embodiment of the invention illustrated in FIG. 4.

FIG. 5 is a cross-sectional view 5-5 from the embodiment of the invention illustrated in FIG. 4, and illustrates the configuration where rams 256 (component parts 254-255), 264 (component parts 262-263) and 274 (component parts 272-273) have been rotated within outer sleeve cavity 248, 249 and 268, to one of the several different settings in tension and/or compression. FIG. 5 shows tap driver 250, first ram 256 (component parts 254-255), first ram springs 257, first bearing 252, second ram 264 (component parts 262-263), second ram spring 265, second bearing 260, third ram 274 (component parts 272-273), third ram spring 275 and third bearing 270, positioned around tap driver spindle

212. FIG. 5 further shows outer sleeve 251, first outer sleeve cavity 249, second outer sleeve cavity 247, and third outer sleeve cavity 248.

Figure 6:
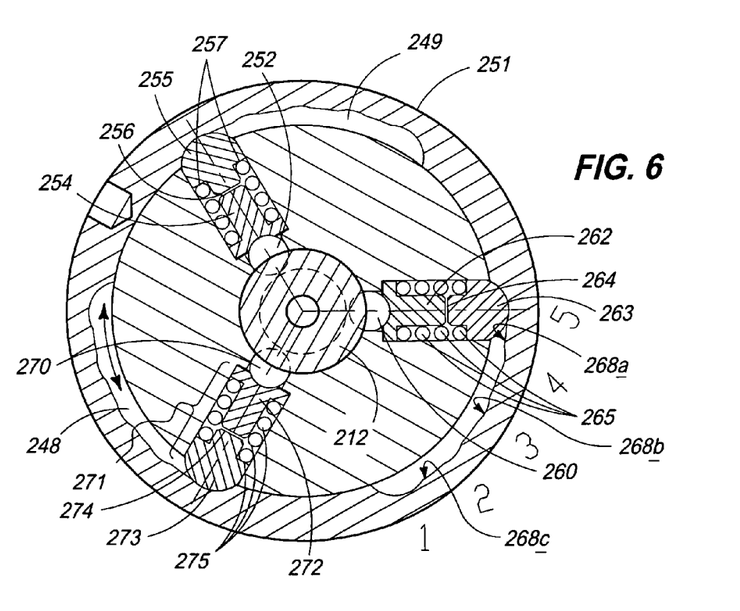
FIG. 6 is a cross-sectional view 5-5 from the embodiment of the invention illustrated in FIG. 1, wherein the collar has been rotated relative to its position in FIG. 4.

FIG. 6 is cross-sectional view 5-5 from the embodiment of the invention illustrated in FIG. 4, wherein the collar has been rotated relative to its position in FIG. 4. The item numbers in FIG. 6 are the same as in FIG. 5, and will not be repeated identified here. FIG. 6 illustrates the configuration where rams 256, 264 and 275 have been rotated within outer sleeve cavities 248, 249 and 268, to a different setting in tension and/or compression than that shown in FIG. 5.

Figure 7:
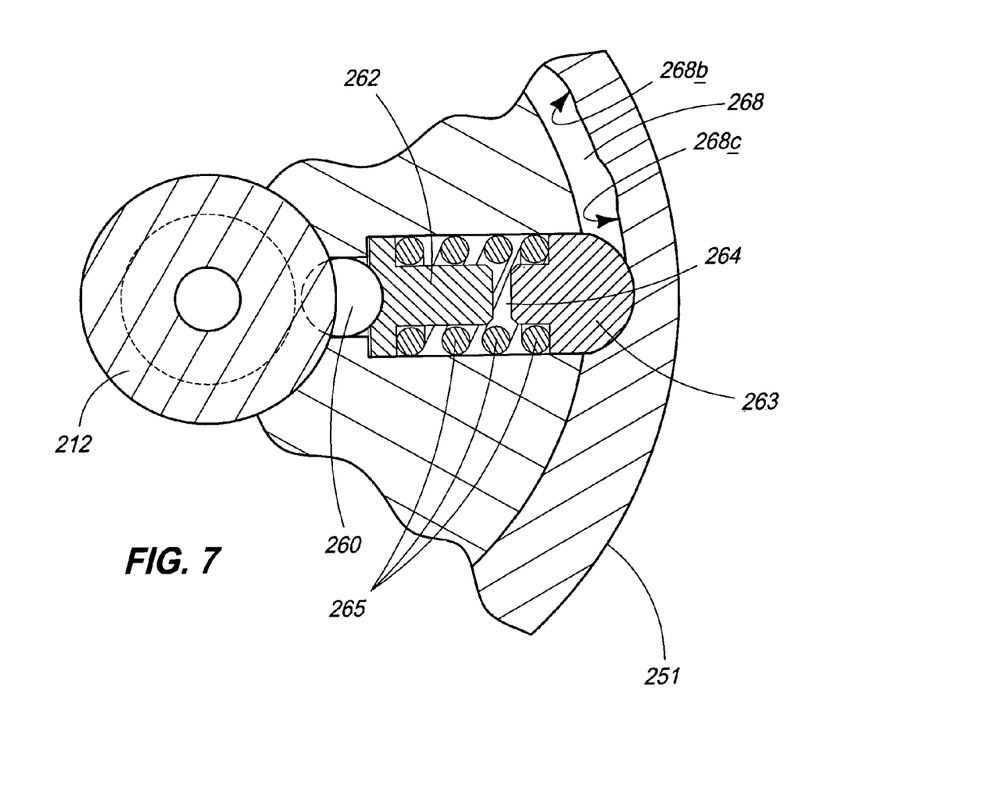
FIG. 7 is a partial detail cross-section of the embodiment illustrated in FIG. 5.

FIG. 7 is a partial detail cross-section of the embodiment illustrated in FIG. 5, and illustrates ram 264 comprised of components 262 and 263 with spring 265 there-between, bearing 260, tap driver spindle 212, outer sleeve 251 with outer sleeve cavity 268 and outer sleeve cavity surfaces 268*b* and 268*c* shown. It can be seen how bearing 260 interfaces through an indent in ram component 262 and a corresponding indent (angular surface or cam pin/pocket) in tap driver spindle 212.

Figure 8:
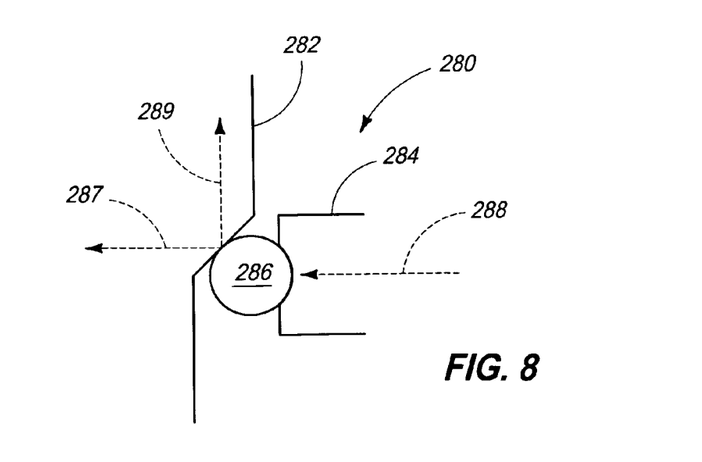
FIG. 8 is a schematic detail representation of one example of an embodiment wherein a lateral force is converted to a force in the axial direction of the tap holder.

FIG. 8 is a schematic detail representation of one example of an embodiment wherein a laterally directed force is converted to a force in the axial direction of the tap holder. FIG. 8 illustrates in schematic form how lateral force 288 imposed through ram 284 imposes a force on bearing 286, which is then converted to an axial force 289 and a horizontal force 287 on driver body 282.

It will be appreciated by those of ordinary skill in the art that there are numerous different interface configurations that may be utilized within the scope of this invention, including the use of a differently configured bearing or force transmission component (potentially of a different shape) as well as the surface for surfaces on the tap driver spindle which interact with the bearing or force transmission component, all within the contemplation of this invention. This invention is not limited to one particular type of interface, the use of a spherical bearing or any particular type of surface or shape of surface on the tap driver spindle. The invention is described more fully herein provides a way to, through the imposition of a lateral force on a force transmission component (which may be a spherical ball bearing), imposes an axial force in tension and/or compression on the tap chuck.

Figures 9, 10:
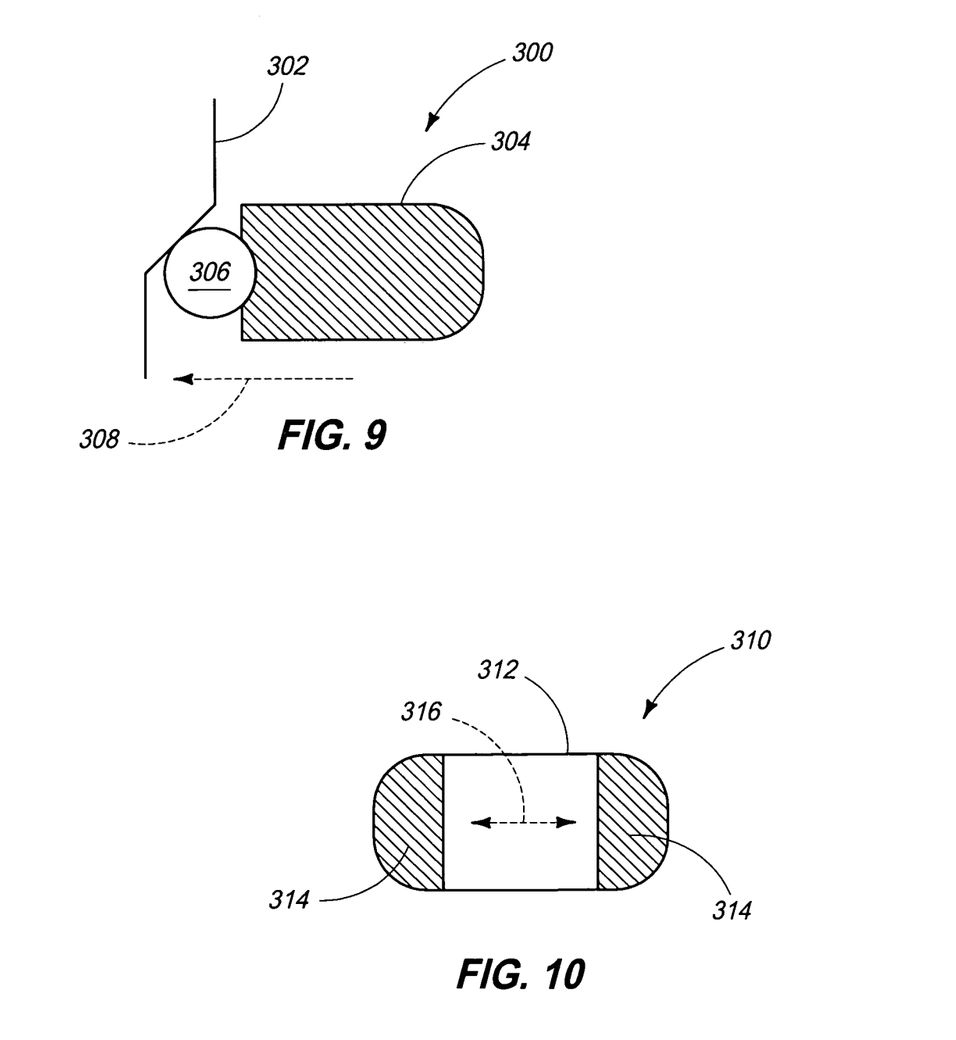
FIG. 9 is a detail representation of one example of an embodiment contemplated by this invention wherein the lateral force is imposed via a solid component.
FIG. 10 is a detail representation of one example of an embodiment contemplated by this invention wherein the solid component through which the lateral force is transmitted has flexure or resiliency.

FIG. 9 is a detail representation of one example of an embodiment 300 contemplated by this invention wherein the lateral force 308 is imposed via a solid ram or component. While other embodiments described herein show a ram that is compressible, such as with an internal spring, FIG. 9 illustrates a solid ram 304 that is not generally compressible. FIG. 9 illustrates solid ram 304, bearing 306 inset within ram 304 and interacting and interfacing with tap driver spindle 302. This invention is not limited to any one particular type of ram, solid, compressible, or otherwise, but instead contemplates any one of a number of different types of brands, including but not limited to those shown and described herein.

FIG. 10 is a detail representation of one example of an embodiment 310 contemplated by this invention wherein the force transmission component 312 through which the lateral force is transmitted, includes a flexure portion or internal resiliency within the material or ram 312. FIG. 10 illustrates ram 312, solid components 314 and flexible compressible center component 316.

Figure 11:
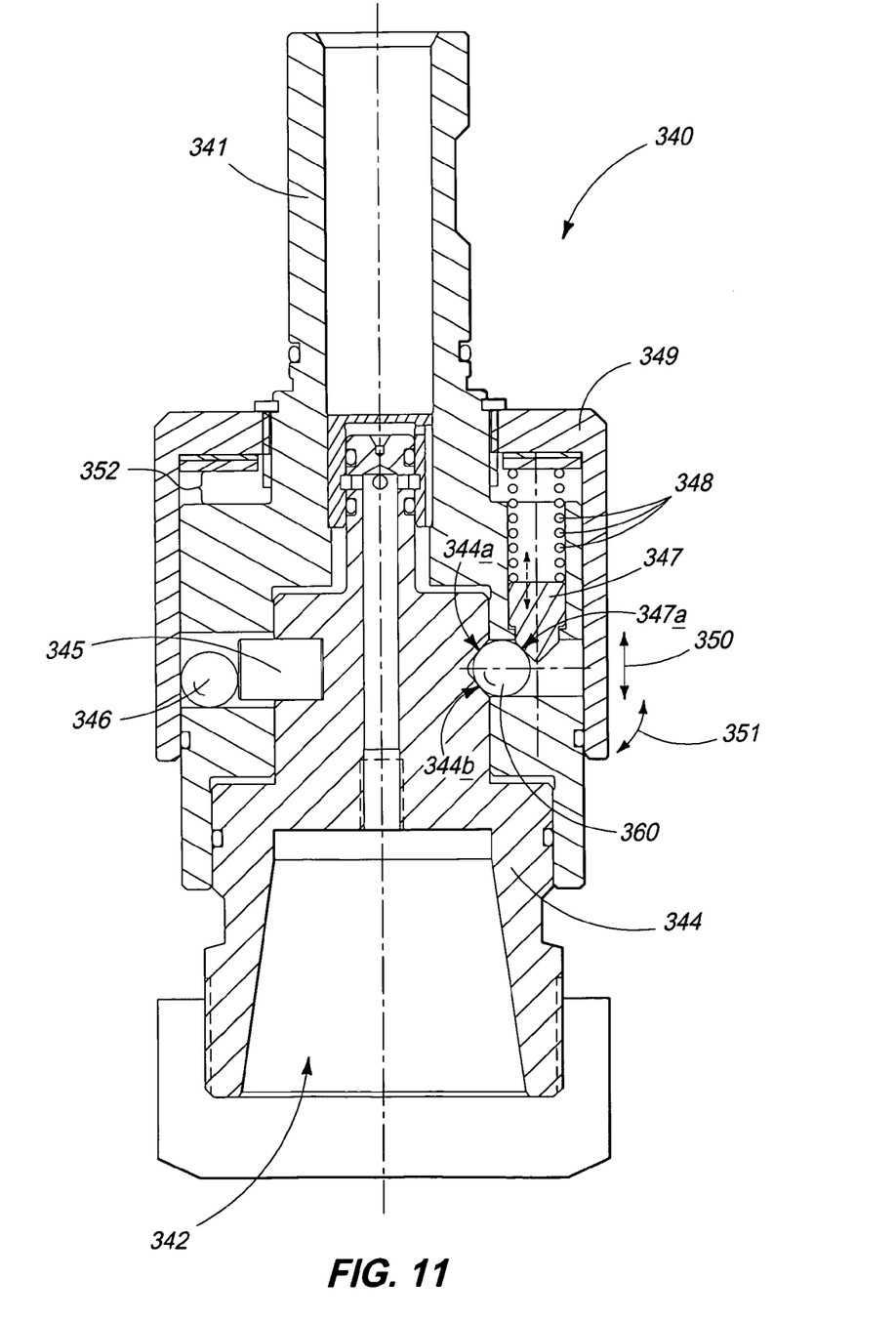
FIG. 11 is a cross-section elevation view of another alternative example of an embodiment contemplated by this invention, illustrating an alternative mechanism to impart a lateral force consequently producing an axial force (tension or compression), on the chuck portion of the tap driver.

FIG. 11 is a cross-section elevation view of another alternative example of an embodiment 340 contemplated by this invention, illustrating an alternative mechanism to impart a lateral force and consequently thereby produce an axial force on the chuck portion 342 of the tap driver. FIG. 11 illustrates holder 340 with chuck portion 342, outer sleeve 349, drive pin 345, drive bearing 346, and tap driver spindle 344. Distance 352 changes as outer sleeve 349 is rotated, increasing and decreasing. As the distance 352 is decreased by rotating outer sleeve 349, additional force is placed on bearing 360 through ram 347, which increases the resistance to tension and/or compression forces on the chuck portion of the tap through the tap driver spindle 344.

FIG. 11 shows another way of providing the desired laterally inward force, utilizing a vertically or axially movable ram 347. Outer sleeve 349 is threaded on or attached to the tap holder and may be rotated about the axis of the tap holder. As can be seen from FIG. 11, when outer sleeve 349 is rotated it causes it to move in the axial direction (vertically in this embodiment), which compresses spring 348 and causes vertical force on ram 347. The interface of ram surface 347*a* with bearing 360 imposes a laterally inward force on bearing 360 and imposes said force on tap driver spindle 344 via tap driver spindle surface 344*a* and tap driver spindle surface 344*b*. The embodiment illustrated in FIG. 11 may provide a smaller size or diameter of tap holder.

The cam pin or pocket (surfaces 344*a* and 344*b*) in the tap driver spindle 344 may be constructed at several different angles to increase or decrease force needed for the desired tension or compression. It will also be appreciated that the example of the embodiment illustrated in FIG. 11 can be infinitely adjustable to different settings as opposed to the incremental possibilities illustrated in other embodiments shown elsewhere herein. It will also be noted that in the example of the embodiment shown in FIG. 11, the bearing(s) may also be considered rams.

As will be appreciated by those of reasonable skill in the art, there are numerous embodiments to this invention, and variations of elements and components which may be used, all within the scope of this invention. In one embodiment for example a tap driver for rigid or synchronous tapping is provided which includes: a tap driver spindle comprising: a shank portion at a first end of the tap driver spindle, the shank portion configured to be secured to a tapping machine; a chuck portion at a second end of the tap driver; and a central body portion between the shank portion and the chuck portion, the central body portion having at least one of an adjustable pre-set defined axial compression and an adjustable pre-set defined axial tension, both imposed through a lateral force. In some such embodiments, the central body portion is infinitely adjustable.

In another embodiment of this invention, a tap driver for rigid or synchronous tapping may be provided, which comprises: a tap driver spindle comprising: a shank portion at a first end of the tap driver spindle, the shank portion configured to be secured to a tapping machine; a chuck portion at a second end of the tap driver; and a central body portion between the shank portion and the chuck portion, one or more inwardly biased bearings, each with an inward end which operatively asserts a defined biased force on the chuck portion; an outer sleeve rotatably mounted around at least part of the tap driver spindle configured to impart a force on one or more tension rams; and wherein rotation of the outer sleeve imparts different forces on the tension rams, thereby resulting in an adjustable pre-set axial compression and an adjustable pre-set axial tension.

Further and additional embodiments from that described in the preceding paragraph may include any one or more of the following: a tap driver for rigid tapping: wherein the biased force is a spring operably positioned between the tension ram and the tap driver spindle; wherein the tension ram is comprised of a resilient material and operably compressed between the tension ram and the tap driver spindle; wherein a spherical interface is positioned between the tension ram and a recession in the chuck portion of the tap driver; and/or wherein the tension ram is axially oriented relative to the tap driver.

In another embodiment of the invention, a tension floating tap driver or a tap driver for rigid or synchronous tapping may be provided which comprises: a tap driver spindle comprising: a shank portion at a first end of the tap driver spindle, the shank portion configured to be secured to a tapping machine; a chuck portion at a second end of the tap driver; and a central body portion between the shank portion and the chuck portion, the central body portion having an adjustable pre-set axial tension through one or more inwardly biased radial tension rams, each with an inward end which operatively asserts a defined biased force on the chuck portion. This embodiment may further comprise a force interface which receives radially inward force from the one or more inwardly biased radial tension rams and transmits biasing force axially to the tap collet; and/or a force interface which receives radially inward force from the one or more inwardly biased radial tension rams and transmits biasing force axially to the tap collet; and/or wherein the biasing force axially is a tension force or a compression force. A still further embodiment may be further wherein the force interface which receives radially inward force from the one or more inwardly biased radial tension rams and transmits biasing force axially to the tap collet is a ball bearing.

In yet another embodiment of this invention, a tap driver for rigid or synchronous tapping may be provided which comprises: a tap driver spindle comprising: a shank portion at a first end of the tap driver spindle, the shank portion configured to be secured to a tapping machine; a chuck portion at a second end of the tap driver; and a central body portion between the shank portion and the chuck portion; and one or more rams, each imparting laterally inward force on a force transmission component which imposes a defined axially directed biased force on the chuck portion.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A tap driver for rigid or synchronous tapping, comprising:
   (a) a tap driver spindle comprising:
      (i) a shank portion at a first end of the tap driver spindle, the shank portion configured to be secured to a tapping machine;
      (ii) a chuck portion at a second end of the tap driver spindle;
      (iii) a central body portion between the shank portion and the chuck portion, the central body portion having one or more inwardly biased force transmission components with an arcuate inward end which operatively asserts a defined biased force on the chuck portion, and at least one of an adjustable pre-set defined axial compression and an adjustable pre-set defined axial tension, wherein both of the adjustable pre-set defined axial compression and adjustable pre-set defined axial tension are imposed through a lateral force imparted on the one or more force transmission components.

2. A tap driver for rigid or synchronous tapping as recited in claim 1, and wherein the central body portion is adjustable between multiple preset locations which provides multiple incremental tensions.

3. A tap driver for rigid or synchronous tapping as recited in claim 1, and further wherein the at least one of an adjustable pre-set defined axial compression and an adjustable pre-set defined axial tension, are imposed through one or more force transmission components comprised of:
   one or more combinations of bearings and tension rams abutting said bearings, each of the one or more bearings with an inward end which operatively asserts a defined biased force on the chuck portion and an outward end which abuts the one or more tension rams;
   an outer sleeve rotatably mounted around at least part of the tap driver spindle configured to impart a force on one or more tension rams toward the one or more bearings; and
   wherein rotation of the outer sleeve imparts different forces on the tension rams, thereby resulting in an adjustable pre-set axial compression and an adjustable pre-set axial tension.

4. A tap driver for rigid or synchronous tapping as recited in claim 1, and further wherein the lateral force is imposed with an adjustable pre-set axial tension through one or more inwardly biased force transmission components which each include one or more inwardly biased radial tension rams, each with an inward end which operatively asserts a defined biased force on the chuck portion.

5. A tap driver for rigid or synchronous tapping as recited in claim 1, and further wherein the one or more inwardly biased force transmission components are bearings.

6. A tap driver for rigid or synchronous tapping, comprising:
   (a) a tap driver spindle comprising:
      (i) a shank portion at a first end of the tap driver spindle, the shank portion configured to be secured to a tapping machine;
      (ii) a chuck portion at a second end of the tap driver spindle;
      (iii) a central body portion between the shank portion and the chuck portion;
      (iv) one or more inwardly biased bearings and one or more tension rams each corresponding to one of the one or more bearings, each of the one or more bearings with an inward end which operatively asserts a defined biased force on the chuck portion and an outward end which abuts the one or more tension rams;
      (v) an outer sleeve rotatably mounted around at least part of the tap driver spindle configured to impart a force on one or more tension rams toward the one or more bearings; and
      (vi) wherein rotation of the outer sleeve imparts different forces on the tension rams, thereby resulting in an adjustable pre-set axial compression and an adjustable pre-set axial tension.

7. A tap driver for rigid or synchronous tapping as recited in claim 6, and further wherein the biased force is a spring operably positioned between the tension ram and the tap driver spindle.

8. A tap driver for rigid or synchronous tapping as recited in claim 6, and further wherein the one or more tension rams are comprised of a resilient material and operably compressed between the one or more bearings and the tap driver spindle.

9. A tap driver for rigid or synchronous tapping as recited in claim 6, and further wherein a spherical interface is positioned between the tension ram and a recession in the chuck portion of the tap driver.

10. A tap driver for rigid or synchronous tapping as recited in claim 6, and further wherein the tension ram is axially oriented relative to the tap driver spindle.

11. A tap driver for rigid or synchronous tapping, comprising:
   a tap driver spindle comprising:
      a shank portion at a first end of the tap driver spindle, the shank portion configured to be secured to a tapping machine;
      a chuck portion at a second end of the tap driver spindle; and
      a central body portion between the shank portion and the chuck portion, the central body portion having one or more inwardly biased radial tension rams with an arcuate inward end which operatively asserts a defined biased force on the chuck portion, and an adjustable pre-set axial tension through the one or more inwardly biased radial tension rams, wherein the adjustable pre-set axial tension is imposed through a lateral force imparted on the one or more inwardly biased radial tension rams.

12. A tap driver for rigid or synchronous tapping as recited in claim 11, and further comprising a force interface which receives radially inward force from the one or more inwardly biased radial tension insert rams; and further wherein the biasing force transmitted to the tap driver spindle through the force interface is a tension force in the axial direction of the tap driver spindle.

13. A tap driver for rigid or synchronous tapping as recited in claim 11, and further wherein the biasing force transmitted to the tap driver spindle through the force interface is a compression force in the axial direction of the tap driver spindle.

14. A tap driver for rigid or synchronous tapping as recited in claim 13, and further wherein the biasing force transmitted to the tap driver spindle through the force interface is also a tension force in the axial direction of the tap driver spindle.

15. A tap driver for rigid or synchronous tapping as recited in claim 11, and further wherein the radial tension rams with the arcuate inward end include a ram portion and a ball bearing portion and which transmits biasing force axially to the chuck portion.

16. A tap driver for rigid or synchronous tapping, comprising:
   a tap driver spindle comprising:
      a shank portion at a first end of the tap driver spindle, the shank portion configured to be secured to a tapping machine;
      a chuck portion at a second end of the tap driver spindle; and
      a central body portion between the shank portion and the chuck portion; and
      one or more rams, each imparting a pre-determined laterally inward force on a force transmission component which imposes a defined axially directed biased force on the chuck portion.

* * * * *